(12) United States Patent
Cheun et al.

(10) Patent No.: US 8,451,953 B2
(45) Date of Patent: May 28, 2013

(54) METHOD AND APPARATUS FOR DETECTING SPACE-TIME BLOCK CODES

(75) Inventors: Kyungwhoon Cheun, Pohang-si (KR); Jeong Chang Kim, Yeongdo-gu (KR)

(73) Assignee: POSTECH Academy-Industry Foundation, Pohang-si (KR)

( * ) Notice: Subject to any disclaimer, the term of this patent is extended or adjusted under 35 U.S.C. 154(b) by 344 days.

(21) Appl. No.: 12/881,435

(22) Filed: Sep. 14, 2010

(65) Prior Publication Data

US 2011/0064168 A1    Mar. 17, 2011

(30) Foreign Application Priority Data

Sep. 16, 2009  (KR) .................. 10-2009-0087731

(51) Int. Cl.
*H04L 25/067*  (2006.01)
(52) U.S. Cl.
USPC .......................................... 375/340; 375/316
(58) Field of Classification Search
USPC ......................................................... 375/340
See application file for complete search history.

(56) References Cited

U.S. PATENT DOCUMENTS

| | | | | |
|---|---|---|---|---|
| 5,822,452 A * | 10/1998 | Tarolli et al. | ................... | 382/166 |
| 7,477,703 B2 * | 1/2009 | Hottinen et al. | ............... | 375/299 |
| 7,680,200 B2 * | 3/2010 | Kwun et al. | ................... | 375/260 |
| 8,094,757 B2 * | 1/2012 | Qu | ................................. | 375/340 |
| 2005/0128983 A1 * | 6/2005 | Kim et al. | ..................... | 370/334 |
| 2005/0157809 A1 * | 7/2005 | Yuk | .............................. | 375/267 |
| 2005/0190853 A1 * | 9/2005 | Tirkkonen | ..................... | 375/295 |
| 2005/0281322 A1 * | 12/2005 | Lee et al. | ....................... | 375/146 |
| 2006/0029149 A1 * | 2/2006 | Kim et al. | ..................... | 375/267 |
| 2006/0215738 A1 * | 9/2006 | Kokkonen | ..................... | 375/148 |
| 2006/0274846 A1 * | 12/2006 | Bauch | ............................ | 375/267 |
| 2007/0041467 A1 * | 2/2007 | Kim et al. | ..................... | 375/267 |
| 2008/0089446 A1 * | 4/2008 | Lee et al. | ....................... | 375/333 |
| 2008/0285687 A1 * | 11/2008 | Qu | ................................ | 375/340 |
| 2009/0086803 A1 * | 4/2009 | Choi et al. | ..................... | 375/227 |
| 2009/0097598 A1 * | 4/2009 | Lee et al. | ....................... | 375/346 |
| 2009/0135964 A1 * | 5/2009 | Bahng et al. | ................... | 375/341 |

(Continued)

FOREIGN PATENT DOCUMENTS

| KR | 10-2007-0019345 | 2/2007 |
|---|---|---|
| KR | 10-0731984 | 6/2007 |
| KR | 10-2009-0052657 | 5/2009 |

OTHER PUBLICATIONS

Notice of Allowance issued on Feb. 11, 2011 for the corresponding KR Patent Application No. 10-2009-0087731.

*Primary Examiner* — Sam K Ahn
*Assistant Examiner* — Santiago Garcia
(74) *Attorney, Agent, or Firm* — Occhiuti Rohlicek & Tsao LLP (57) ABSTRACT

A method for detecting a space-time block code is provided. The method includes randomly selecting one initial candidate layer ($x_N$) with respect to a signal vector $\tilde{y}$, applying a DF algorithm to first J number of layers ($x_{N-1}, x_{N-2}, \ldots, x_{N-J}$) with respect to all the available candidate symbols within the initial candidate layer ($x_N$) to generate candidate symbols of each of the J number of layers, re-arranging the J number of layers, selecting the lowest layer of the re-arranged J number of layers as a new candidate layer, performing a DF process on the other remaining layers, excluding the new candidate layer, to generate N-dimensional candidate symbol vectors $x_i$, and performing a maximum likelihood detection on the $x_i$ to detect an N-dimensional input vector $\hat{x}$.

8 Claims, 7 Drawing Sheets

U.S. PATENT DOCUMENTS

| | | | |
|---|---|---|---|
| 2009/0262871 A1* | 10/2009 | Jung et al. | 375/341 |
| 2010/0158159 A1* | 6/2010 | Lee et al. | 375/340 |
| 2010/0238824 A1* | 9/2010 | Farajidana et al. | 370/252 |
| 2011/0016325 A1* | 1/2011 | Futa et al. | 713/179 |
| 2011/0019777 A1* | 1/2011 | Qu | 375/340 |
| 2011/0080972 A1* | 4/2011 | Xi et al. | 375/267 |
| 2011/0080981 A1* | 4/2011 | Su et al. | 375/341 |
| 2011/0096658 A1* | 4/2011 | Yang et al. | 370/210 |

* cited by examiner

$$\tilde{y} = \begin{bmatrix} \tilde{y}_1 \\ \vdots \\ \tilde{y}_{N-J} \\ \vdots \\ \tilde{y}_{N-1} \\ \tilde{y}_N \end{bmatrix} = \begin{bmatrix} r_{1,1} & \cdots & r_{1,N-J} & \cdots & r_{1,N-1} & r_{1,N} \\ 0 & \ddots & \vdots & & \vdots & \vdots \\ & \ddots & r_{N-J,N-J} & \cdots & r_{N-J,N-1} & r_{N-J,N-1} \\ \vdots & & 0 & \ddots & \cdots & \vdots \\ \vdots & & & & r_{N-J,N-1} & r_{N-1,N} \\ 0 & \cdots & 0 & \cdots & 0 & r_{N,N} \end{bmatrix} \begin{bmatrix} x_1 \\ \vdots \\ x_{N-J} \\ \vdots \\ x_{N-1} \\ x_N \end{bmatrix} + \begin{bmatrix} \tilde{w}_1 \\ \vdots \\ \tilde{w}_{N-J} \\ \vdots \\ \tilde{w}_{N-1} \\ \tilde{w}_N \end{bmatrix}$$

310 — Layer index N

⋮

Layer index 1

↑ Initial candidate layer(300)

(300)  J number of layers(310)

| Initial candidate layer $x_N$ | $x_{N-1}$ | ⋯ | $x_{N-J}$ |
|---|---|---|---|
| $S_1$ | $S_1$ | ⋯ | $S_2$ |
| $S_2$ | $S_1$ | ⋯ | $S_2$ |
| ⋮ | ⋮ | ⋯ | ⋮ |
| $S_Q$ | $S_3$ | ⋯ | $S_3$ |

320

$\alpha_2$ number of differents candidate symbols(330)   $\alpha_{J+1}$ number of differents candidate symbols(340)

Column ordering  After column ordering (360) (N-1)number of layers

| New candidate layer $x_{N-1}$ | $x_N$ | $x_{N-2}$ | ⋯ | $x_1$ |
|---|---|---|---|---|
| $S_1$ | $S_1$ | $S_1$ | ⋯ | $S_2$ |
| $S_3$ | $S_1$ | $S_1$ | ⋯ | $S_2$ |
| ⋮ | ⋮ | ⋮ | ⋯ | ⋮ |

α number of different candidate vectors

METHOD AND APPARATUS FOR DETECTING SPACE-TIME BLOCK CODES

CROSS-REFERENCE TO RELATED APPLICATIONS

This application claims the benefit of priority of Korean Patent application No. 10-2009-0087731 filed on Sep. 16, 2009, all of which are incorporated by reference in their entirety herein.

BACKGROUND OF THE INVENTION

1. Field of the Invention

The present invention relates to wireless communication and, more particularly, to a method and apparatus for detecting space-time block codes.

2. Related Art

Schemes using a plurality of transmission/reception antennas include a spatial multiplexing scheme and a space-time coding scheme. The spatial multiplexing scheme such as a vertical bell laboratory space-time (V-BLAST) and the like is a scheme of simultaneously transmitting independent data signals through different transmission antennas. A receiver of a V-BLAST system employs detection schemes using QR decomposition of an equivalent space-time channel matrix, and a DF (Decision Feedback) algorithm, an ML (Maximum Likelihood)/DF algorithm obtained by combining ML and DF algorithms, a PD (Parallel Detection) algorithm, p-PD algorithm, and the like, are representative detection schemes. Korean Patent Registration No. 10-0659281 may be referred to in relation to definitions, content, and the like, of the detection schemes including the p-PD algorithm. The DF algorithm based on interference nulling and interference cancellation is very simple but causes a severe performance degradation due to error propagation.

In the ML/DF algorithm, first some transmission layers are detected by using the ML algorithm and the other remaining layers are detected by using the DF algorithm. Thus, reliability of data symbols used in the interference cancellation process can be improved.

In the PD algorithm, one layer called a candidate layer is first selected and the DF algorithm is applied to the other remaining layers with respect to each of candidate symbols of the candidate layer, thereby improving performance compared with the DF algorithm. A candidate symbol vector that minimizes Euclidean distance between candidate symbol vectors and reception vectors obtained from the process is selected to thus make a final decision.

The p-PD algorithm, an extended PD algorithm, is selecting two or more candidate layers. The PD algorithm provides performance close to that of the ML algorithm while having a rational detection complexity over up to four transmission antennas. However, the PD algorithm shows a severe performance degradation with an increased number of antennas. Thus, in order to maintain the ML performance, the p-PD scheme using two or more candidate layers is required. However, the use of more than two candidate layers results in a considerable increase in the detection complexity.

Meanwhile, the space-time coding scheme is a method of applying coding to a time axis and a space axis in order to obtain both spatial diversity and coding gain. Space-time block codes (STBCs) having orthogonal characteristics based on an orthogonal design theory have been proposed as a scheme for obtaining an optimum transmission antenna diversity gain. These orthogonal STBCs (O-STBCs) have a maximum diversity order and have an advantage in that it can detect a maximum likelihood even by simply performing linear processing at a reception end. In case of an STBC without having such a special structure as orthogonality, its complexity of maximum likelihood detection increases at the ratio of arithmetical (geometrical) progression over a modulation order Q and the number N of transmission antennas.

Recently, there has been an attempt to apply the DF algorithm to an STBC detection, which, however, involves a severe performance degradation compared with the ML detection. In order to obtain performance close to that of the ML algorithm, a sphere decoding (SD) scheme has been applied to the STBC detection. Besides, the SD algorithm, the V-BLAST detection algorithms such as the PD and p-PD algorithms can be also applicable to an STBC system having an equivalent space-time channel matrix. The PD algorithm causes a slight performance loss compared with the ML detection, whereas the p-PD algorithm provides the substantially same performance as that of the ML detection. However, although the detection complexity of the PD and p-PD algorithms is significantly low compared with the ML detection, it is still too high to be implemented over a large modulation order.

SUMMARY OF THE INVENTION

Therefore, an object of the present invention is to provide a quasi-optimum detection method and apparatus capable of fundamentally reducing a detection complexity in a receiver of a general space-time block code (STBC) system. In an aspect, a method for detecting a space-time block code includes randomly selecting one initial candidate layer ($x_N$) with respect to a signal vector $\tilde{y}$, applying a DF algorithm to first J number of layers ($x_{N-1}, x_{N-2}, \ldots, x_{N-J}$) with respect to all the available candidate symbols within the initial candidate layer ($x_N$) to generate candidate symbols of each of the J number of layers, re-arranging the J number of layers, selecting the lowest layer of the re-arranged J number of layers as a new candidate layer, performing a DF process on the other remaining layers, excluding the new candidate layer, to generate N-dimensional candidate symbol vectors $x_i$, and performing a maximum likelihood detection on the $x_i$ to detect an N-dimensional input vector $\hat{x}$.

In re-arranging the J number of layers, a column order alignment may be performed within an equivalent space-time channel matrix H such that a layer having a minimum number $$\alpha \left( \alpha \triangleq \min_i \alpha_i, i = 1, 2, \ldots, J+1 \right)$$

of candidate symbols, among the different number of candidate symbols $\alpha_i$ generated from each of the J number of layers, is positioned at the undermost.

The signal vector $\tilde{y}$ may be obtained through obtaining an N-dimensional signal vector $\hat{y}$ re-arranged with an equivalent space-time signal model with respect to an N-dimensional reception vector y received by reception antennas, performing QR-decomposition on the equivalent space time channel matrix H into H=QR to generate a unitary matrix Q and an upper triangular matrix R, and multiplying a complex conjugate transposed matrix $Q^H$ of the unitary matrix Q to the left side of the signal vector $\hat{y}$ to generate the N-dimensional signal vector $\tilde{y}$.

In another aspect, a method for detecting a space-time block code includes first randomly selecting p ($p \geq 2$) number of initial candidate layers ($x_N, \ldots x_{N-p+1}$) with respect to a signal vector ỹ, applying a DF algorithm to first K number of layers $(x_{N-p}, \ldots x_{N-p-K+1})$ with respect to each of combinations of all the available candidate symbols within the initial candidate layers to generate candidate symbols of each of the K number of layers, re-arranging the K number of layers, selecting the lowest p number of layers, after performing the column order alignment, as new candidate layers, performing a DF algorithm on the other remaining layers, excluding the new candidate layers, to generate N-dimensional candidate symbol vectors $x_i$, and performing a maximum likelihood detection on the N-dimensional candidate symbol vectors $x_i$ to detect an N-dimensional input vector $\hat{x}$.

In re-arranging the K number of layers, a column order alignment may be performed within an equivalent space-time channel matrix H such that a combination of layers having a minimum number $$\beta\left(\beta \triangleq \min_i \beta_i, i = 1, 2, \ldots, \binom{K}{p}\right)$$

of candidate symbol vectors, among the number $\beta_i$; of p-dimensional different candidate symbol vectors generated from each of the combinations of the K number of layers, is positioned at the undermost.

The signal vector ỹ is obtained through obtaining an N-dimensional signal vector ŷ re-arranged with an equivalent space-time signal model with respect to an N-dimensional reception vector y received by reception antennas, performing QR-decomposition on the equivalent space time channel matrix H into H=QR to generate a unitary matrix Q and an upper triangular matrix R, and multiplying a complex conjugate transposed matrix $Q^H$ of the unitary matrix Q to the left side of the signal vector ŷ to generate the N-dimensional signal vector ỹ.

DESCRIPTION OF EXEMPLARY EMBODIMENTS

Exemplary embodiments of the present invention will now be described in detail with reference to the accompanying drawings.

A method for detecting a space-time block code (STBC) can be applicable to a wireless communication system including N number of transmission antennas and M number of reception antennas. Here, a system using a single reception antenna will be described as an example for the sake of brevity, but the present invention is not meant to be limited thereto.

Figure 1:
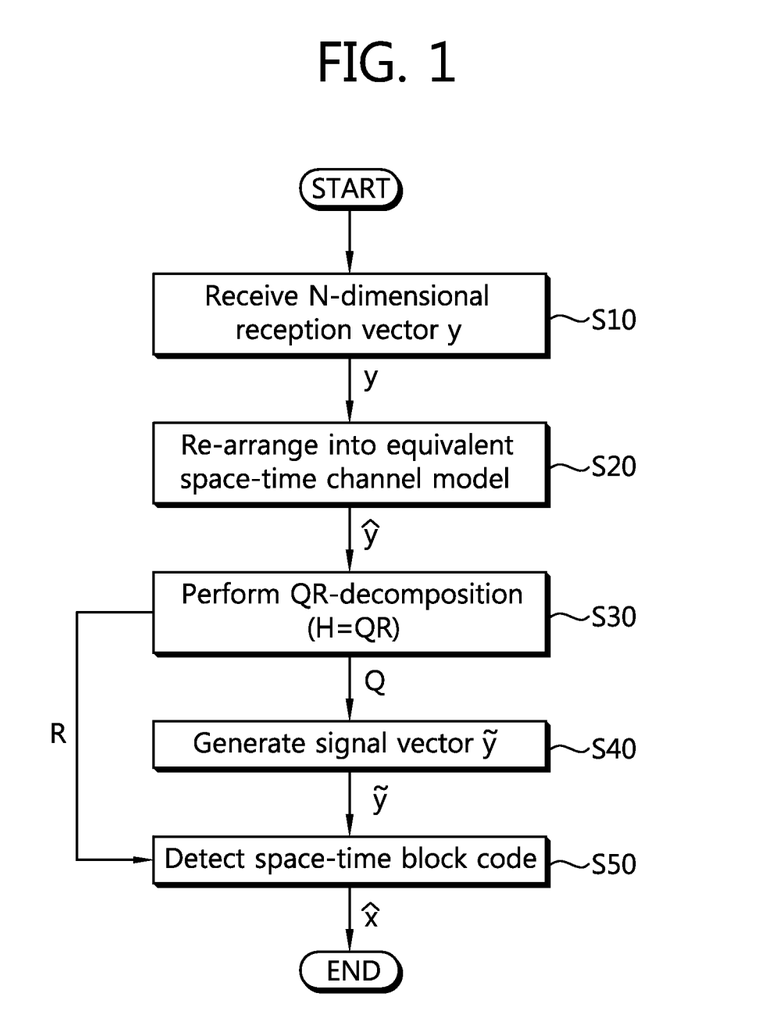
FIG. 1 is a flow chart illustrating the process of a detection method according to an exemplary embodiment of the present invention.

FIG. 1 is a flow chart illustrating the process of a detection method according to an exemplary embodiment of the present invention.

As shown in FIG. 1, a detection method according to an exemplary embodiment of the present invention includes outputting N-dimensional signal vector ŷ re-arranged with an equivalent space-time signal model with respect to N-dimensional reception vector y received by a reception antenna (S20), QR-decomposing an equivalent space-time channel matrix H corresponding to the equivalent space-time signal mode to generate a unitary matrix Q and an upper triangular matrix R (S30), multiplying a complex conjugate transposed matrix $Q^H$ of the unitary matrix Q to the left side of the signal vector ŷ to generate an N-dimensional signal vector ỹ (S40), detecting an N-dimensional input vector $\hat{x}$ with respect to the signal vector ỹ (S50).

In a general STBC, an input column vector $x^T = [x_1, \ldots x_N]$ having a length N is inputted to a space-time-encoder to generate N×N codeword matrix $G(x) = \{g_{t,n}\}$. Here, the codeword symbol $g_{t,n}$ is transmitted to nth transmission antenna at tth time interval.

It is assumed that a channel between a transmission antenna and a reception antenna is an independent Rayleigh fading channel. It is also assumed that a channel is a quasi-static channel not allowing a channel value to be changed while a single codeword matrix is transmitted therethrough. Then, a matched filter output value $y_t$ of the reception antenna during the tth time interval is given as represented by Equation 1 shown below:

$$y_t = \frac{1}{\sqrt{N}} \sum_{n=1}^{N} h_n g_{t,n} + w_t, t = 1, 2, \ldots, N \quad \text{[Equation 1]}$$

Here, a channel constant $h_n \triangleq h_n^I + j h_n^Q$ is a complex channel gain between the nth transmission antenna and reception antenna, and $h_n^I$ and $h_n^Q$ e are i.i.d. (Independent and identically-distributed) Gaussian random variables having an average value of 0 and a distribution value of 0.5. In addition, $w_t \triangleq w_t^I + j w_t^Q$ indicates contribution to thermal noise at the tth time interval, and $w_t^I$ and $w_t^Q$ are i.i.d. Gaussian random variables having an average value of 0 and a distribution value of $N_0/2$. In order to allow entire transmission power to be equal to that of a single antenna system for a given time, transmission power at each transmission antenna is normalized.

The matched filter output values $y_t$ may be represented by N-dimensional reception column vector $y^T = [y_1, \ldots, y_N]$ as follows.

$$y = \frac{1}{\sqrt{N}} Gh + w \quad \text{[Equation 2]}$$

Here, $h^T = [h_1, \ldots, h_N]$, and $w^T = [w_1, \ldots, w_N]$.

The N-dimensional reception vector y can be represented by Equation 3 shown below according to the equivalent space-time signal model:

$$\hat{y} = Hx + \hat{w} \quad \text{[Equation 3]}$$

Here, the N-dimensional matrix ŷ is obtained by selecting proper elements in y as complex conjugates.

The matrix H is an N×N equivalent space-time channel matrix including complex linear combinations of $h_1, \ldots, h_N$ and their complex conjugates, which is assumed to be as a maximum rank. $\hat{w}$ is an N-dimensional equivalent noise vector including $w_1, \ldots, w_N$ and their complex conjugates.

On the assumption that a reception terminal completely know about the value of the equivalent space-time channel matrix H, the reception terminal may perform a maximum likelihood detection to select an N-dimensional input vector $\hat{x}$ as represented by Equation 4 shown below:

$$\hat{x} = \underset{\tilde{x}}{\operatorname{argmin}} \|\tilde{y} - H\tilde{x}\|^2 \qquad \text{[Equation 4]}$$

Here, $\|\ \|$ indicates a Frobenius norm value.

In step S20 of re-arranging the N-dimensional signal vector $\hat{y}$ to the equivalent space-time channel model, the N-dimensional signal vector $\hat{y}$ is generated by selecting proper elements of the reception vector y as complex conjugates.

In step S30 of performing QR decomposition, the equivalent space-time channel matrix H is QR-decomposed to generate the N×N unitary matrix Q and the N×N upper triangular matrix R as represented by Equation 5 shown below:

$$H = QR \qquad \text{[Equation 5]}$$

In step S40 of generating the signal vector $\tilde{y}$, the N-dimensional signal vector $\tilde{y}$ is generated by multiplying the complex conjugate transposed matrix $Q^H$ of the unitary matrix Q to the left side of the inputted N-dimensional signal vector $\hat{y}$ as represented by Equation 6 shown below:

$$\tilde{y} \triangleq Q^H \hat{y} = Rx + \tilde{w} = \begin{bmatrix} r_{1,1} & r_{1,2} & \cdots & r_{1,N} \\ 0 & r_{2,2} & \cdots & r_{2,N} \\ \vdots & \ddots & \ddots & \vdots \\ 0 & \cdots & 0 & r_{N,N} \end{bmatrix} \begin{bmatrix} x_1 \\ x_2 \\ \vdots \\ x_N \end{bmatrix} + \begin{bmatrix} \tilde{w}_1 \\ \tilde{w}_2 \\ \vdots \\ \tilde{w}_N \end{bmatrix} \qquad \text{[Equation 6]}$$

Here, $\tilde{w} \triangleq [\tilde{w}_1, \tilde{w}_2, \ldots, \tilde{w}_N]^T = Q^H \hat{w}$ has the same statistical characteristics as those of w.

By QR-decomposing the equivalent space-time channel matrix H, a V-BLAST detection algorithm can be applicable to a space-time block code (STBC).

Figure 2:
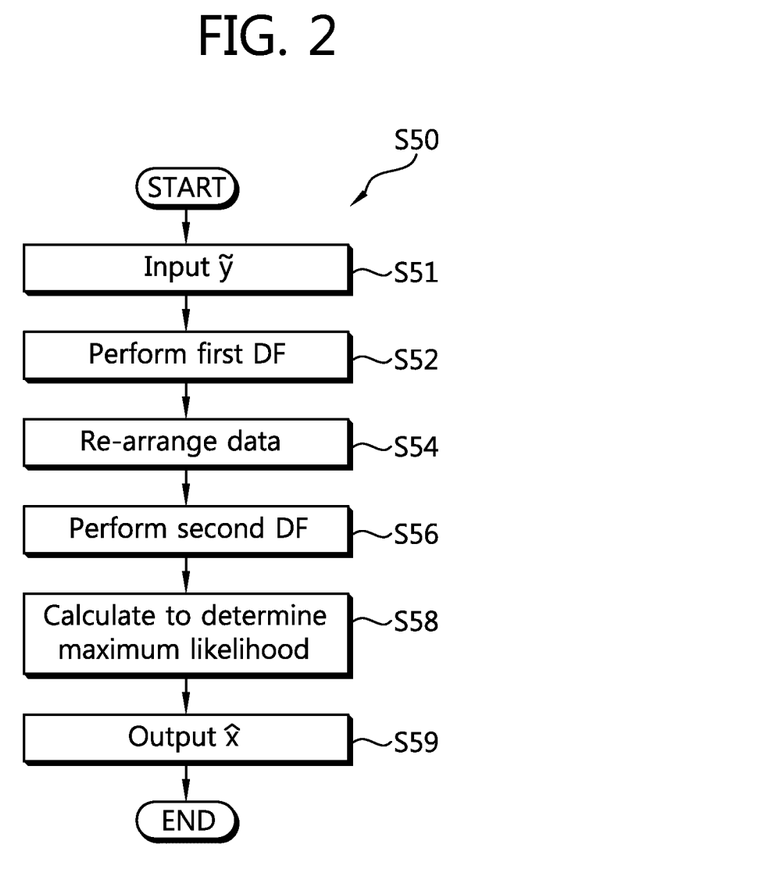
FIG. 2 is a flow chart showing sub-steps of the space-time block code detection step of FIG. 1.

FIG. 2 is a flow chart showing sub-steps of the space-time block code detection step (S50) of FIG. 1. As for the method for detecting an STBC with reference to FIG. 2, when the signal vector $\tilde{y}$ generated in step S40 is inputted (S51), a first DF performing step (S52) of generating candidate symbols in each layer by applying a DF algorithm, a step (S54) of re-arranging layers according to values of the generated candidate symbols, a second DF performing step (S54) of generating candidate symbols by applying the DF algorithm again to the layers selected according to a certain reference from the re-arranged layers to generate candidate symbols, and a maximum likelihood determination calculation step (S58) of detecting the N-dimensional input vector $\hat{x}$ are performed.

The first DF performing step (S52), the layer re-arranging step (S54), and the second DF performing step (S56) may be performed through an RR-PD detection method, an RR-p-PD detection method, and the like.

First, a performing method according to the RR-PD detection method will now be described as one of methods for performing the steps proposed by the present invention.

According to the RR-PD detection method, the first DF performing step (S52), the layer re-arranging step (S54), and the second DF performing step (S56) are performed as follows: One initial candidate layer is randomly selected with respect to an inputted signal vector $\tilde{y}$, and a DF algorithm is applied to first J ($1 \leq J \leq N-1$) number of layers of each of them to generate candidate symbols in each layer (S52); the column order within the equivalent space-time channel matrix H is changed such that a layer having the smallest value among candidate symbols corresponding to each of the generated layers is positioned at the undermost (S54); and after the column order alignment, the lowest layer is selected as a new candidate layer and a DF process is performed on the other remaining layers to generate the N-dimensional candidate symbol vectors $x_i$ (S56).

Figure 3:
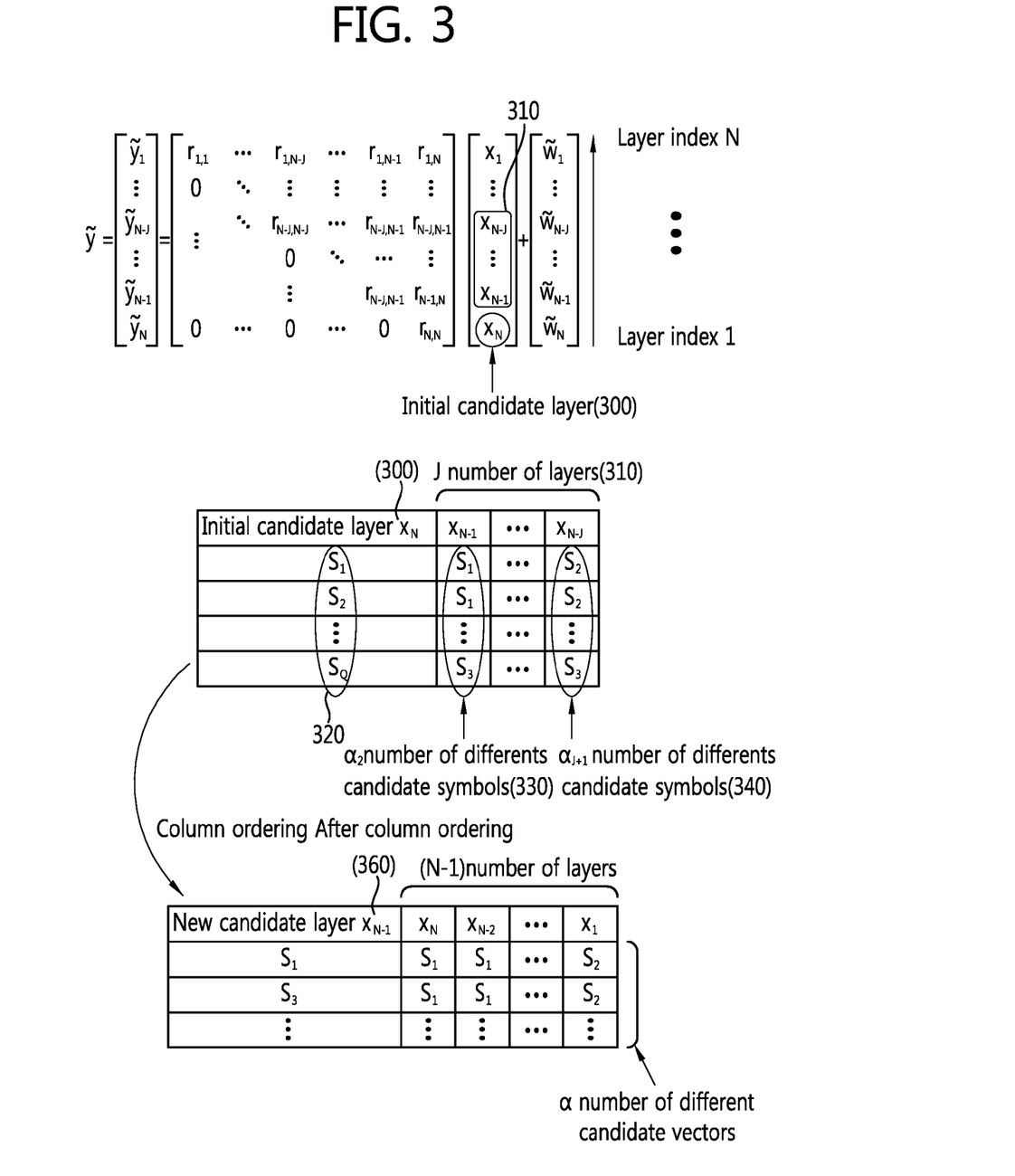
FIG. 3 illustrates the RR-PD detection method.

FIG. 3 illustrates the RR-PD detection method.

In the first DF performing step (S52) one initial candidate layer is first randomly selected with respect to a signal vector $\tilde{y}$ and the DF algorithm is applied to first J ($1 \leq J \leq N-1$) number of layers 310 with respect to all the available Q number of candidate symbols within the initial candidate layer ($x_N$, 300) to generate candidate symbols of each layer. Here, the number of different candidate symbols generated from the ith (i=1, 2, ..., J+1) is $\alpha_i$.

When the minimum number of candidate symbols, among the number of different candidate symbols $\alpha_i$, is $\alpha$, $\alpha$ can be represented by Equation 7 shown below:

$$\alpha \triangleq \min_i \alpha_i, \, i = 1, 2, \ldots, J+1 \qquad \text{[Equation 7]}$$

In the layer re-arranging step (S54), a column order alignment (re-arrangement) is performed within the equivalent space-time channel matrix H such that a layer having the minimum number a of candidate symbols is positioned at the undermost, to replace the original initial candidate layer. After the column order alignment is performed within the equivalent space-time channel matrix H, QR decomposition is performed on the generated new $H_{ordered,RR-PD}$. FIG. 3 illustrates a case in which the number $\alpha_2$ of different candidate symbols generated from the second layer ($x_{N-1}$, 360) is the smallest.

In the second DF performing step (S56), the DF algorithm is applied to each of the $\alpha$ number of candidate symbols within the new candidate layer to generate a number of candidate vectors $x_i$ (i=1, 2, ..., $\alpha$).

In the maximum likelihood determination calculation step (S58), a maximum likelihood determination calculation is performed on the $\alpha$ number of candidate vectors ($x_i$) to detect the N-dimensional input vector $\hat{x}$.

Next, a performing method according to the RR-p-PD detection method will now be described as another method for performing the steps proposed by the present invention. According to the RR-p-PD detection method, the first DF performing step (S52), the layer re-arranging step (S54), and the second DF performing step (S56) are performed as follows: A DF algorithm is applied to first K number of layers with respect to each of available p-dimensional candidate symbols vectors within p number of initial candidate layers to generate candidate symbols in each layer (S52); the column order within the equivalent space-time channel matrix H is changed such that a combination of p number of layers in which the number of different candidate symbol vectors is the smallest among all the available p number of layer combinations from the K number of layers is positioned at the undermost (S54), and after the layer re-arrangement, p number of lowest layers are selected as new candidate layers and the DF algorithm is performed on the other remaining layers to generate the N-dimensional candidate symbol vectors $x_i$ (S56).

Figure 4:
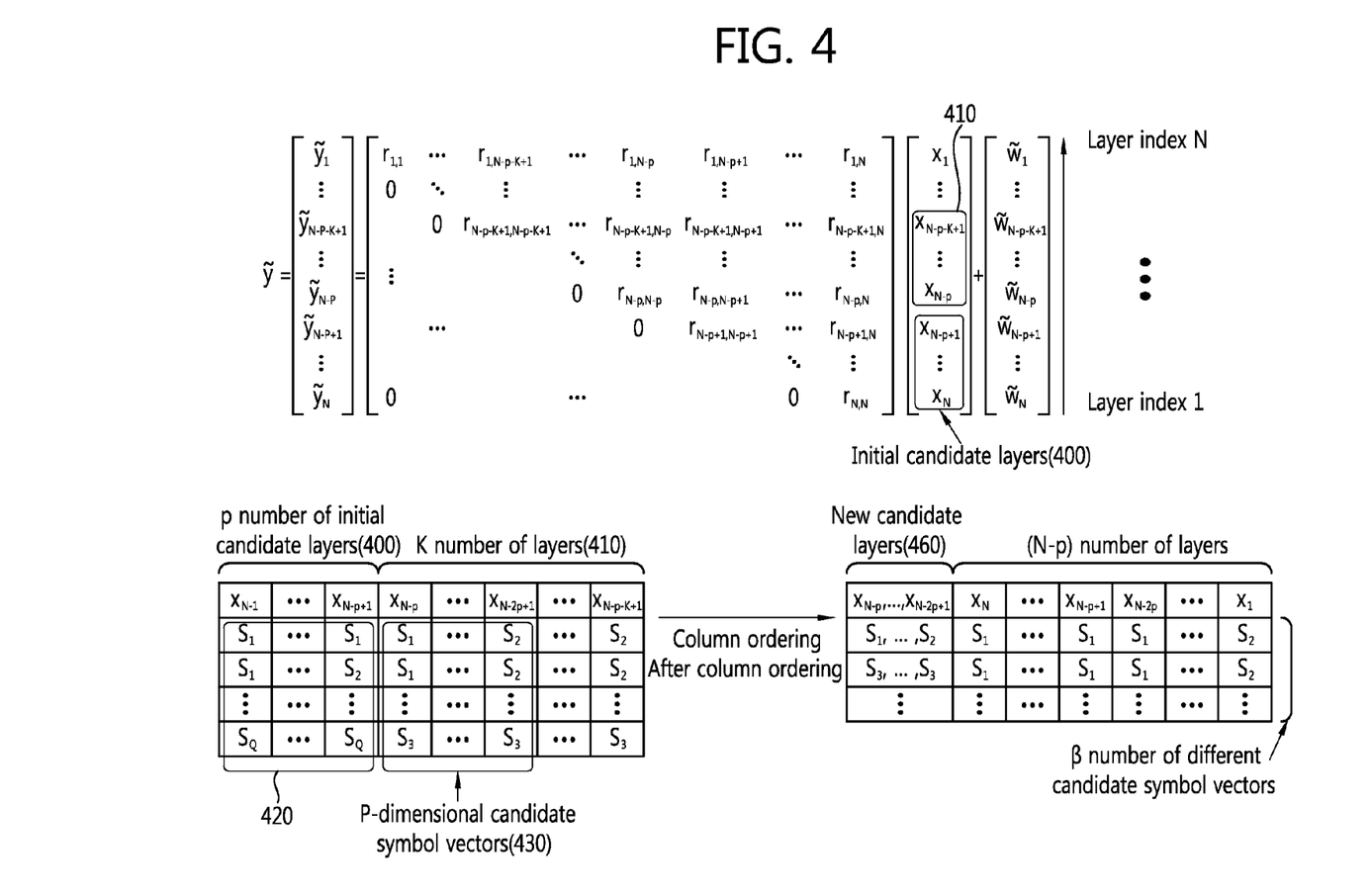
FIG. 4 illustrates the RR-p-PD detection method.

FIG. 4 illustrates the RR-p-PD detection method.

With reference to an inputted signal vector ỹ, first, a first DF performing unit randomly selects p number of initial candidate layers 400 and applies the DF algorithm to first K ($p \leq K \leq N-p$) number of layers 410 with respect to each of $Q^p$ number of all the available candidate symbol vectors 420 within the initial candidate layers to generate candidate symbols of each layer. The p number of different layers may be combined from the K number of layers to generate $$\binom{K}{p}$$

number of combinations, and $$\beta_i \left(1 \leq \beta_i \leq Q^p, i = 1, 2, \ldots, \binom{K}{p}\right)$$

number of p-dimensional candidate symbol vectors exist with respect to each of the layer combinations.

When the minimum number of candidate symbol vectors, among the number ($\beta_i$ of p-dimensional candidate symbol vectors, is $\beta$, $\beta$ may be represented by Equation 8 shown below:

$$\beta \stackrel{\Delta}{=} \min_i \beta_i, i = 1, 2, \ldots, \binom{K}{p} \quad \text{[Equation 8]}$$

In the layer re-arranging step (S54), a column order alignment is performed within the equivalent space-time channel matrix H such that the p number of layers having the minimum number $\beta$ of candidate symbol vectors are positioned at the undermost, to replace the original initial candidate layers. After the column order alignment is performed within the equivalent space-time channel matrix H, QR decomposition is performed on the generated new $H_{ordered,RR-p-PD}$. FIG. 4 illustrates a case in which the number of different candidate symbol vectors with respect to the combination of the layers corresponding to a layer index p+1, p+2, . . . , p+K is the smallest.

In the second DF performing step (S56), the DF algorithm is applied to each of the $\beta$ number of p-dimensional candidate symbol vectors within the new candidate layers to generate $\beta$ number of N-dimensional candidate symbol vectors $x_i$(i=1, 2, . . . , $\beta$).

In the maximum likelihood determination calculation step (S58), a maximum likelihood determination calculation is performed on the $\beta$ number of candidate vectors ($x_i$) to detect the N-dimensional input vector x̂.

Figure 5:
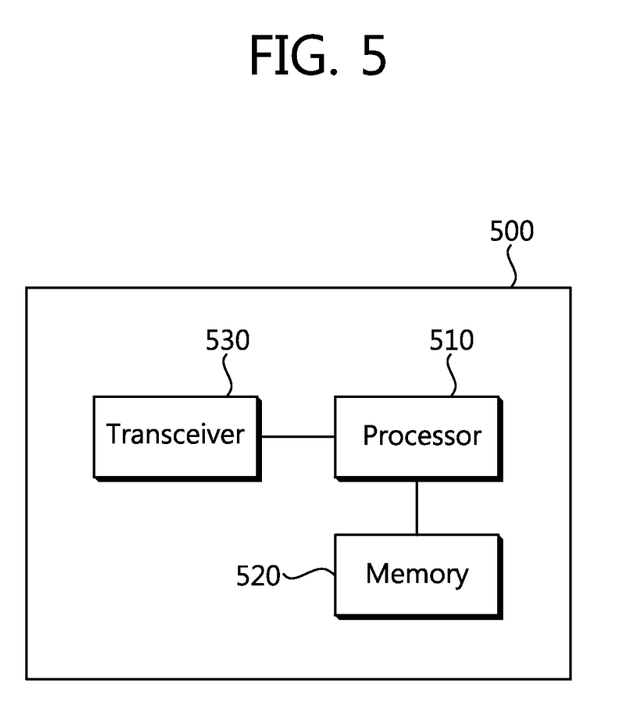
FIG. 5 is a schematic block diagram of a receiver implementing an exemplary embodiment of the present invention.

FIG. 5 is a schematic block diagram of a receiver implementing an exemplary embodiment of the present invention.

The receiver 500 includes a processor 510, a memory 520, and a transceiver 530. The transceiver 530 transmits and receives radio signals. The processor 510 may be connected to the transceiver 530 to implement the foregoing space-time block code detection method.

The processor 510 and/or the transceiver 530 may include an ASIC (application-specific integrated circuit), a chip-set, a logic circuit and/or a data processor. The memory 520 may include a ROM (read-only memory), a RAM (random access memory), a flash memory, a memory card, a storage medium and/or any different storage unit. When an embodiment is implemented by software, the foregoing scheme may be implemented with modules (processes, functions, and the like) performing the foregoing functions. The modules may be stored in the memory 520 and executed by the processor 510. The memory 520 may be present within or outside the processor 510 and may be connected to the processor 510 by various known means.

Figure 6:
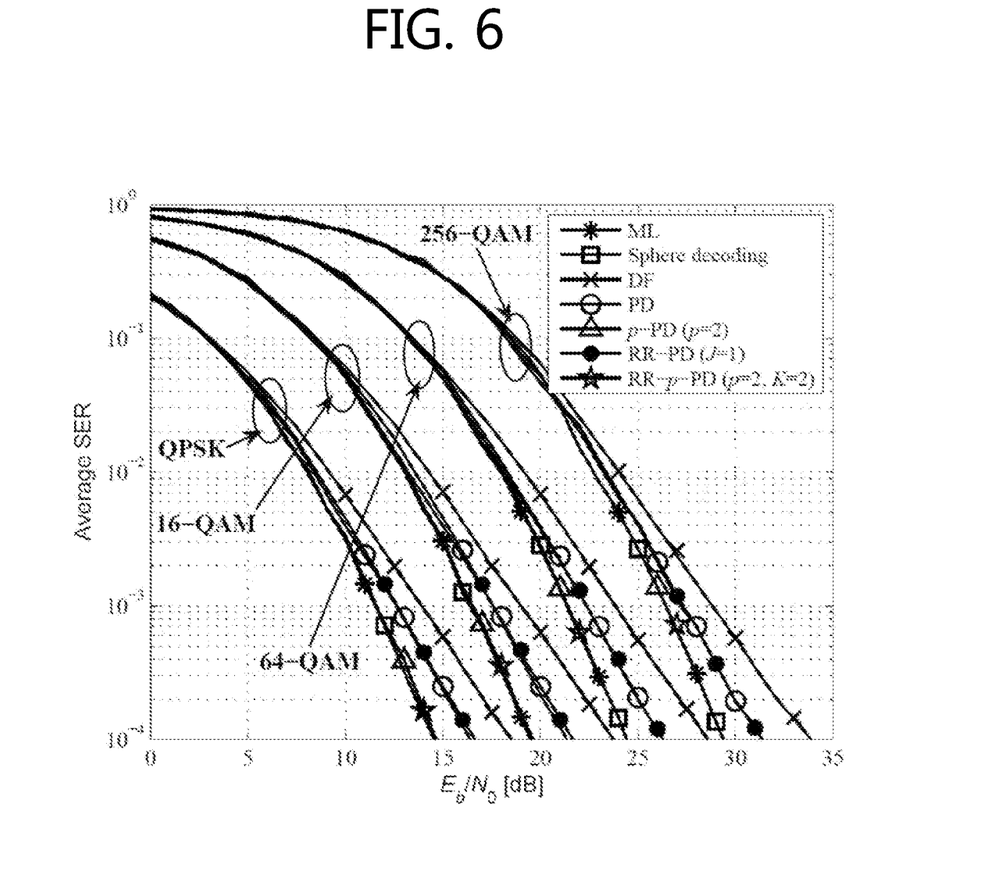
FIG. 6 is a graph showing average symbol error rates (SERs) of respective schemes obtained by experimentation by using A-ST-CR (Alamouti Space-Time Constellation-Rotating) under the Rayleigh fading channel.

FIG. 6 is a graph showing average symbol error rates (SERs) of respective schemes obtained by experimentation by using A-ST-CR (Alamouti Space-Time Constellation-Rotating) under the Rayleigh fading channel. The code A-ST-CR used in the experimentation is a space-time block code, whose format and content may be referred to the following reference document:

REFERENCE DOCUMENT

T. Jung and K. Cheun, Design of concatenated space-time block codes using signal space-diversity and the Alamouti scheme, IEEE Communications Letters, vol. 7, no. 7, pp. 329-331, July 2003.

It is noted from the graph of FIG. 6 that the RR-PD scheme according to an exemplary embodiment of the present invention exhibits the substantially same performance as that of the existing PD scheme, and the RR-p-PD scheme according to an exemplary embodiment of the present invention exhibits the substantially same performance as that of the existing p-PD scheme.

Figure 7:
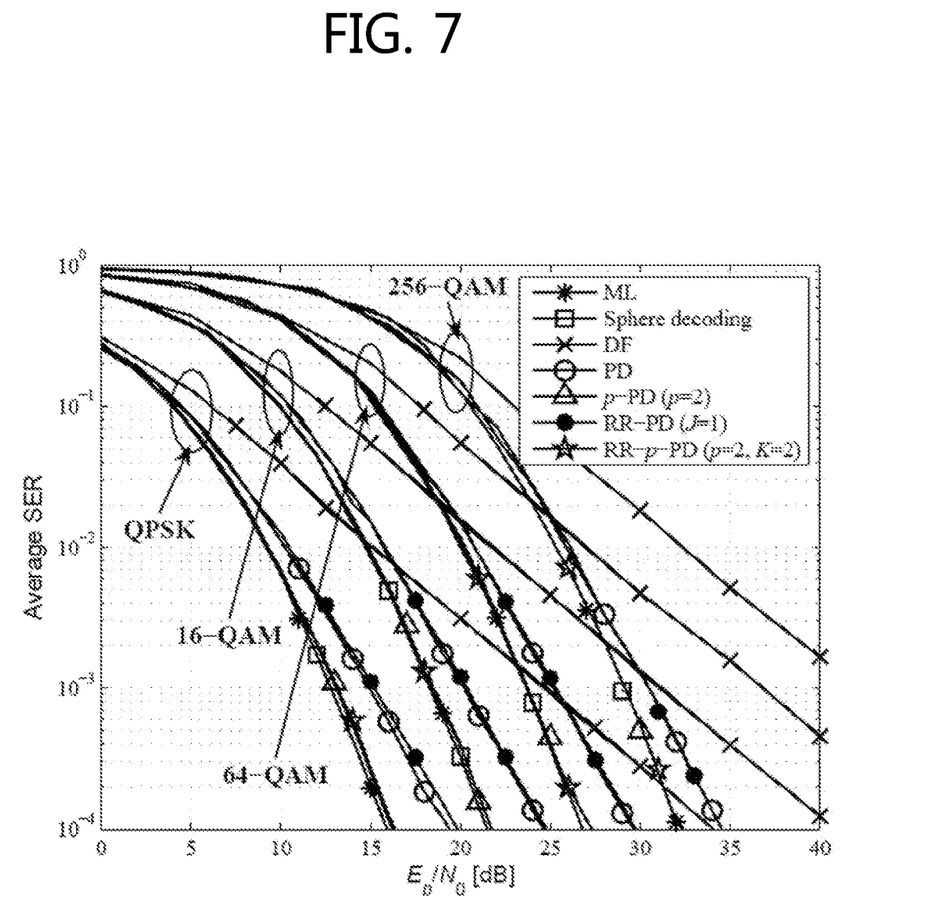
FIG. 7 is a graph showing average symbol error rates (SERs) of respective schemes obtained by experimentation by using ST-CR (Space-Time Constellation-Rotating) under the Rayleigh fading channel.

FIG. 7 is a graph showing average symbol error rates (SERs) of respective schemes obtained by experimentation by using ST-CR (Space-Time Constellation-Rotating) under the Rayleigh fading channel. The code ST-CR used in the experimentation is a space-time block code, whose format and content may be referred to the following reference document:

REFERENCE DOCUMENT

Y. Xin, Z. Wang and G. B. Giannakis, Space-time constellation-rotating codes maximizing diversity and coding gains, in Proc. Int. Conf. on GLOBECOM, vol. 1, pp. 455-459.

It is noted from the graph of FIG. 7 that the RR-PD scheme according to an exemplary embodiment of the present invention exhibits the substantially same performance as that of the existing PD scheme, and the RR-p-PD scheme according to an exemplary embodiment of the present invention exhibits the substantially same performance as that of the existing p-PD scheme.

TABLE 1

| Codes | Algorithm | Number of real multiplications Modulation | | | |
|---|---|---|---|---|---|
| | | QPSK | 16-QAM | 64-QAM | 256-QAM |
| A-ST-CR | ML | 18432 | $4.72 \times 10^6$ | $1.21 \times 10^9$ | $3.09 \times 10^{11}$ |
| | Sphere decoding | 468 | 1325 | 9631 | 138645 |
| | PD | 413 | 697 | 1815 | 6246 |
| | RR-PD (J = 1) | 669 | 757 | 1077 | 2274 |
| | p-PD (p = 2) | 458 | 1283 | 10324 | 138659 |
| | RR-p-PD (p = 2. K = 2) | 733 | 1038 | 2316 | 8836 |
| ST-CR | ML | 18432 | $4.72 \times 10^6$ | $1.21 \times 10^9$ | $3.09 \times 10^{11}$ |
| | Sphere decoding | 484 | 1377 | 11250 | 220265 |
| | PD | 420 | 733 | 1956 | 6797 |
| | RR-PD (J = 1) | 682 | 813 | 1299 | 3138 |
| | p-PD (p = 2) | 466 | 1322 | 10496 | 139302 |
| | RR-p-PD (p = 2. K = 2) | 762 | 1200 | 3161 | 14349 |

Table 1 above shows the comparison of calculation complexity according to the number of multiplications of each scheme.

In Table 1, sphere decoding is the related art method, whose format and content may be referred to the following reference document:

REFERENCE DOCUMENT

O. Damen, A. Chkeif, and J.-C. Belfore, Lattice code decoder for space-time codes, IEEE Communications Letters., vol. 4, no. 5, pp. 161-163, May 2000.

According to Table 1, it is noted that, in the RR-PD scheme according to an exemplary embodiment of the present invention, a calculation complexity reduction gain drastically increases as a modulation order increases, compared with the existing PD scheme, and in the RR-p-PD scheme according to an exemplary embodiment of the present invention, a calculation complexity reduction gain drastically increases as a modulation order increases, compared with the existing p-PD scheme.

In addition, in the RR-PD scheme and the RR-p-PD scheme according to exemplary embodiments of the present invention, the calculation complexity reduction gain drastically increases as the modulation order increases, compared with the existing sphere decoding scheme.

To sum up, the method for detecting a space-time block code according to an exemplary embodiment of the present invention exhibits a reduction in the system complexity while having the substantially same performance compared with the related art detection methods.

In the foregoing illustrative system, the methods are described based on the flow chart with sequential steps or blocks, but the present invention is not meant to be limited to the order of steps and a certain step may be performed in a different order from the foregoing order or may be performed at the same time as another step. Also, it could be understood by the skilled person in the art that the steps in the flow chart are not exclusive but include any other steps or one or more steps in the flow chart may be deleted without affecting the scope of the present invention.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for detecting a space-time block code, the method comprising:
    randomly selecting, by a processor, one initial candidate layer ($x_N$) with respect to a signal vector $\tilde{y}$;
    applying, by the processor, a decision feedback (DF) algorithm to first J (J≧1) layers ($x_{N-1}, x_{N-2}, \ldots, x_{N-J}$) with respect to each of all the available candidate symbols within the one initial candidate layer ($x_N$) to generate candidate symbols of each of the first J layers;
    re-arranging, by the processor, the first J layers according to values of the generated candidate symbols;
    selecting, by the processor, the lowest layer of the re-arranged first J layers as a new candidate layer;
    performing, by the processor, a DF process on remaining layers of the re-arranged first J layers, excluding the new candidate layer, to generate N-dimensional candidate symbol vectors $x_i$; and
    performing, by the processor, a maximum likelihood detection on the $x_i$ to detect an N-dimensional input vector $\hat{x}$.

2. The method of claim 1, wherein, in re-arranging the first J layers, a column order alignment is performed within an equivalent space-time channel matrix H such that a layer having a minimum number α

$$\left(\alpha \triangleq \min_i \alpha_i, i = 1, 2, \ldots, J+1\right)$$

of candidate symbols, among the number $\alpha_i$ of different candidate symbols generated from each of the first J layers, is positioned at the undermost.

3. The method of claim 1, wherein the signal vector $\tilde{y}$ is obtained through the followings:
    obtaining, by the processor, an N-dimensional signal vector $\hat{y}$ re-arranged with an equivalent space-time signal model with respect to an N-dimensional reception vector y received by reception antennas;
    performing, by the processor, QR-decomposition on the equivalent space time channel matrix H into H=QR to generate a unitary matrix Q and an upper triangular matrix R; and multiplying, by the processor, a complex conjugate transposed matrix $Q^H$ of the unitary matrix Q to the left side of the signal vector $\hat{y}$ to generate the N-dimensional signal vector $\tilde{y}$.

4. A method for detecting a space-time block code, the method comprising:
randomly selecting, by a processor, p (p≧2) initial candidate layers ($x_N, \ldots x_{N-p+1}$) with respect to a signal vector $\tilde{y}$;
applying, by the processor, a decision feedback (DF) algorithm to first K (K≧p) layers ($x_{N-p}, \ldots x_{N-p-K+1}$) with respect to each of combinations of all the available candidate symbols within the p initial candidate layers to generate candidate symbols of each of the first K layers;
re-arranging, by the processor, the first K layers according to values of the generated candidate symbols;
selecting, by the processor, the lowest p layers, after performing the column order alignment, as new candidate layers;
performing, by the processor, a DF algorithm on remaining layers of the re-arranged first J layers, excluding the new candidate layers, to generate N-dimensional candidate symbol vectors $x_i$; and
performing, by the processor, a maximum likelihood detection on the N-dimensional candidate symbol vectors $x_i$ to detect an N-dimensional input vector $\hat{x}$.

5. The method of claim 4, wherein, in re-arranging the first K layers, a column order alignment is performed within an equivalent space-time channel matrix H such that a combination of layers having a minimum number β

$$\left(\beta \triangleq \min_i \beta_i, i = 1, 2, \ldots, \binom{K}{p}\right)$$

of candidate symbol vectors, among the number $\beta_i$ of p-dimensional different candidate symbol vectors generated from each of the combinations of the first K layers, is positioned at the undermost.

6. The method of claim 4, wherein the signal vector $\tilde{y}$ is obtained through the followings:
obtaining, by the processor, an N-dimensional signal vector $\hat{y}$ re-arranged with an equivalent space-time signal model with respect to an N-dimensional reception vector y received by reception antennas;
performing, by the processor, QR-decomposition on the equivalent space time channel matrix H into H=QR to generate a unitary matrix Q and an upper triangular matrix R; and
multiplying, by the processor, a complex conjugate transposed matrix $Q^H$ of the unitary matrix Q to the left side of the signal vector $\hat{y}$ to generate the N-dimensional signal vector $\tilde{y}$.

7. A receiver comprising:
a processor configured to randomly select one initial candidate layer (XN) with respect to a signal vector Y and apply a decision feedback (DF) algorithm to first J (J>=1) of layers (XN−1, XN−2, . . . , XN−J) with respect to all the available candidate symbols within the one initial candidate layer (XN) to generate candidate symbols of each of the first J layers according to values of the generated candidate symbols, re-arranging the first J layers, select the lowest layer of the re-arranged first J layers as a new candidate layer and performing a DF process on remaining layers of the re-arranged first J layers, excluding the new candidate layer, to generate N-dimensional candidate symbol vectors Xi, and performing a maximum likelihood detection on the candidate symbol vectors Xi to detect an NA dimensional input vector X; and a transceiver connected operatively to the processor.

8. A receiver comprising:
a processor configured to randomly select p (p>=2) of initial candidate layers (XN, . . . , XN−p+1) with respect to a signal vector Y and apply a decision feedback (DF) algorithm to first K (K>=p) layers (XN−p, . . . , XN−p−K+1) with respect to each of combinations of all the available candidate symbols within the p initial candidate layers to generate candidate symbols of each of the first K layers, rearranging the first K number of layers according to values of the generated candidate symbols, select the lowest of layers, after performing the column order alignment, as new candidate layers and performing a DF algorithm on the other remaining layers of the re-arranged first J layers, excluding the new candidate layers, to generate N-dimensional candidate symbol vectors Xi, and performing a maximum likelihood detection on the N-dimensional candidate symbol vectors Xi to detect an NA dimensional input vector X; and a transceiver connected operatively to the processor.

* * * * *